United States Patent [19]
Yeh

[11] Patent Number: 5,799,988
[45] Date of Patent: Sep. 1, 1998

[54] OIL-TIGHT COUPLING DEVICE

[76] Inventor: Ying Lieh Yeh, No. 9, Alley 22, Lane 301, Feng Chia Rd., Hsi Tun Dist., Taichung, Taiwan

[21] Appl. No.: 674,551

[22] Filed: Jul. 1, 1996

[51] Int. Cl.⁶ .................................................. F16L 21/06
[52] U.S. Cl. ........................... 285/323; 285/161; 285/361; 285/903
[58] Field of Search ..................... 285/322, 323, 285/360, 361, 376, 396, 401, 402, 161, 903

[56] References Cited

U.S. PATENT DOCUMENTS

| | | | |
|---|---|---|---|
| 4,787,657 | 11/1988 | Henniger | 285/323 |
| 5,350,204 | 9/1994 | Henniger | 285/323 |
| 5,397,196 | 3/1995 | Boiret et al. | 285/376 X |
| 5,405,172 | 4/1995 | Mullen | 285/323 X |
| 5,441,312 | 8/1995 | Fujiyoshi et al. | 285/322 X |

*Primary Examiner*—Dave W. Arola
*Attorney, Agent, or Firm*—Beveridge, DeGrandi, Weilacher & Young LLP

[57] ABSTRACT

An oil-tight coupling device includes a hose, an oil-tight gasket, a coupling sleeve, a coupling bushing and a nut. The coupling sleeve is provided with a plurality of equidistantly spaced apart resilient portions that bend inwardly. Each resilient portion has a protruding lip radially disposed at a lower end and a stop piece axially disposed at the lower end. The stop piece is provided with an inclined surface at either side. The coupling bushing is provided with a plurality of projections at an upper end for matching the resilient projections and a curved slot at a lower portion for receiving a stop post of said coupling sleeve to restrict the displacement of the coupling sleeve. By means of the stop post that displaces along the curved slot, the stop pieces may move along the inclined surfaces of the projections to cause the resilient portions to bend inwardly, allowing the lips to enter a neck portion of the hose to quickly secure the hose.

1 Claim, 4 Drawing Sheets

OIL-TIGHT COUPLING DEVICE

BACKGROUND OF THE INVENTION (a) Field of the Invention

The present invention relates generally to a coupling device, and more particularly to a coupling device which may be easy to assemble and dismantle.

(b) Description of the Prior Art

In ordinary processing factories and work machines, in order that relevant electrical wires may be tied together in a bundle to resist oil stain, water moisture or corrosion, it has been known to use hoses to wrap up the electrical wires and couplings to secure the hoses onto the machine. It is known in the art to use a coupling bushing to secure the hose to fasten it in a coupling sleeve. However, it is difficult to dismantle the coupling and the hose afterwards. Press plates or pieces have been used for securing purposes as well. But it will also require a screwdriver to help dismantle the coupling and the hose. It is therefore desirable to have a coupling device of a simple construction that may be assembled and dismantled without any tool.

SUMMARY OF THE INVENTION

Accordingly, a primary object of the present invention is to provide an oil-tight coupling device in which the coupling may be easily assembled or dismantled by turning a coupling sleeve in different directions.

Another object of the present invention is to provide an oil-tight coupling device in which, due to the contact of respective inclined surfaces of a plurality of stop pieces of a coupling sleeve and a plurality of projections of a coupling bushing, a plurality of resilient portions of the coupling sleeve may be caused to contract or expand by the turning of the coupling sleeve in different directions so that the lip portions of the resilient portions may enter or move out of a neck portion of a hose, achieving the object of fast assembly or disassembly of the coupling device.

A further object of the present invention is to provide an oil-tight coupling device in which, when the lip portions of the resilient portions of the coupling sleeve move into the neck portion of the hose, the hose is forced to displace forwardly to urge tightly against an oil-tight gasket, achieving exceptionally good oil-tight effects.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
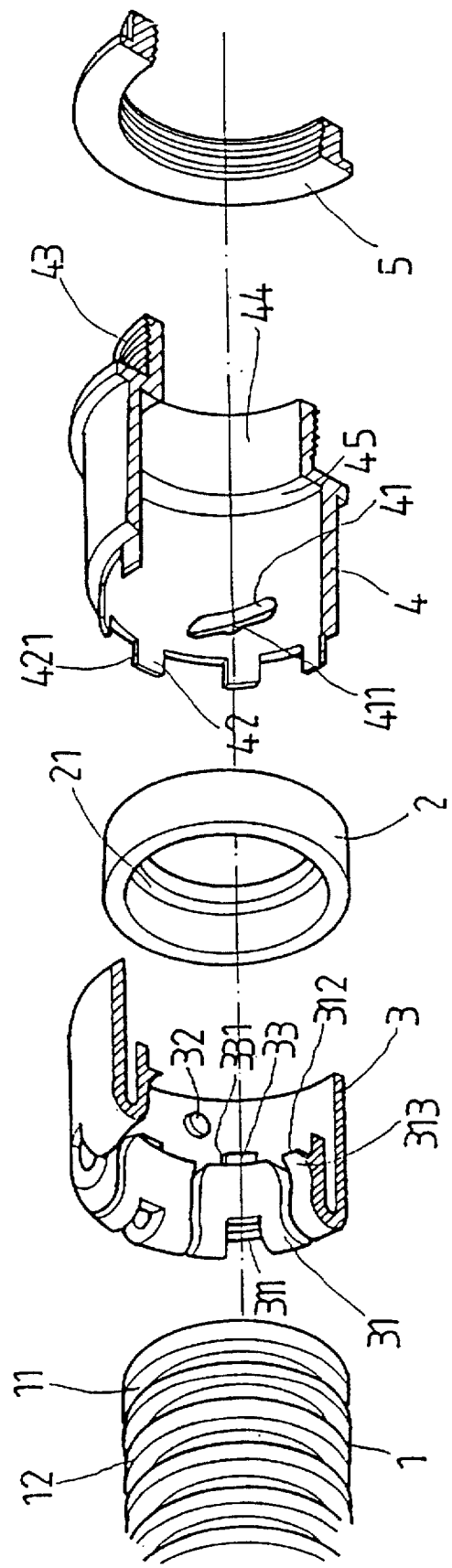
FIG. 1 is an exploded elevational view of the present invention.
Figure 2:
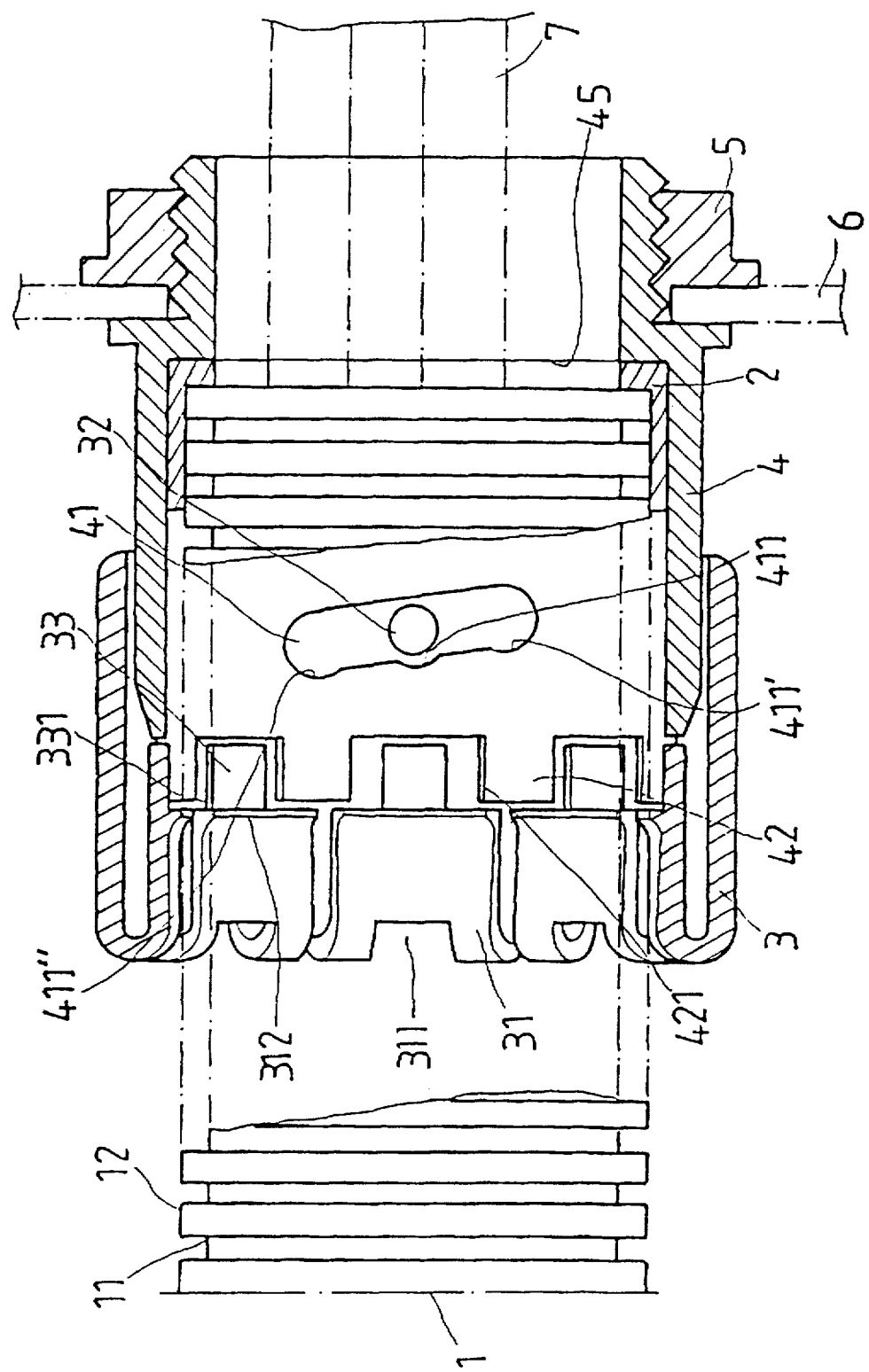
FIG. 2 is a sectional view of the present invention in an assembled state.

With reference to the drawings, the oil-tight coupling device of the present invention essentially comprises a hose 1, an oil-tight annular gasket 2, a coupling sleeve 3, a coupling bushing 4 and a nut 5. After assembly, the coupling device of the invention may be mounted on the machine on-site. With reference to FIGS. 1 and 2, during assembly, the gasket 2 and the coupling sleeve 3 are successively fitted onto the coupling bushing 4 before the hose 1 is inserted into the coupling bushing 4 to urge against the gasket 2. By turning the coupling sleeve 3 to match the coupling bushing 4, the hose 1 may be secured in the coupling bushing 4. The coupling device thus assembled may then be mounted to the machine by locking the nut 5 onto a work panel 6. The coupling sleeve 3 is provided with a plurality of inwardly bending resilient portions 31 at one end thereof. The resilient portions 31 are equidistantly spaced apart from each other and each has an indentation 311 at an top part thereof to enhance its resilience. Each resilient portion 31 further has a radially protruding lip 312 at its bottom end, the lip 312 being connected to the resilient portion 31 by means of a curved edge 313. A stop piece 33 is axially provided at the resilient portion 31. The stop piece 33 is provided with a suitably inclined surface 331 at either side. A stop post 32 is disposed on an inner wall at the other end of the coupling sleeve 3 at a suitable position.

Relatively, the coupling bushing 4 is provided with a plurality of projections 42 at suitable positions for matching the resilient portions 31 of the coupling sleeve 3. Each projection 42 has an inclined surface 421 at either side for matching the stop piece 33. The coupling bushing 4 is further provided with a curved slot 41 at a suitable position for receiving the stop post 32. The curved slot 41 is provided with a plurality of curved bulging portions 411. In this preferred embodiment, three curved bulging portions 411", 411 and 411' are respectively located an an upper portion, a middle portion and a lower portion of the curved slot 41 for positioning the stop post 32 at various locations to secure the coupling sleeve 4 so as to suit different operations. The curved slot 41 is configured in an oblique shape such that one end thereof is nearer to while the other end thereof is farther away from the projections 42, so that the stop post 32 may move along the curved slot 41 to bring the coupling sleeve to displace forwardly or rearwardly. The obliquity of the curved slot 41 should be consistent with that of the the inclined surfaces 421, 33 of the projections 42 and stop pieces 33 respectively. Additionally, a relatively small bore 44 is formed at a bottom surface 45 of the coupling bushing 4 and a plurality of outer threads 43 are formed on the outer side of the lower portion of the coupling bushing 4 for matching the nut 5.

Figure 3:
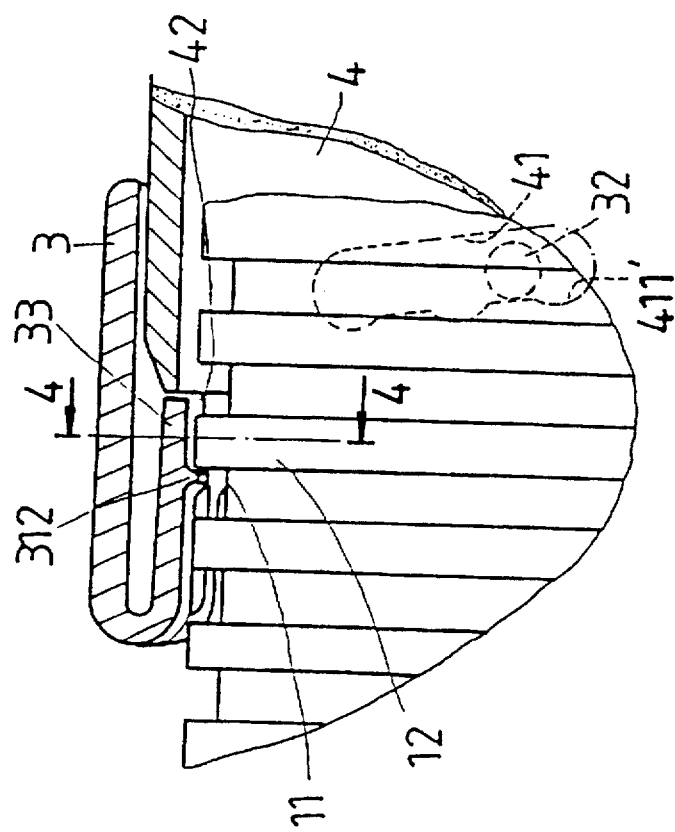
FIG. 3 is a partially sectional view of the present invention.
Figure 4A:
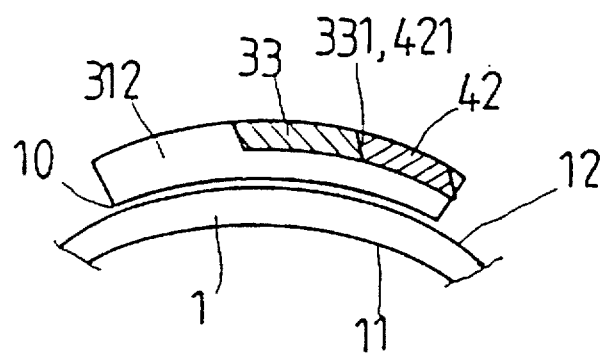
FIGS. 4A, 4B and 4C are respective views showing the relationship between the stop pieces of the coupling sleeve and the projections of the coupling bushing according to the present invention.
Figure 4B:
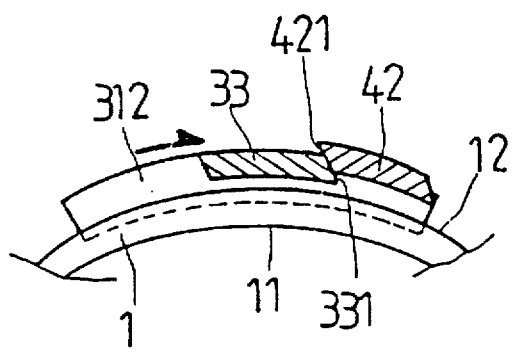

The gasket 2 is provided with an inner annular surface 21 which contacts the bottom surface 45 of the coupling bushing 4 so that the hose 1 may urge thereagainst. With reference to FIG. 2, during assembly, when the coupling sleeve 3 is fitted onto the coupling bushing 4, the stop post 32 is located in the middle curved bulging portion 411 of the curved slot 41 and positioned. When the hose 1 is inserted into the coupling bushing 4, it may rest against the annular surface 21 of the gasket 2. At this point, by turning the coupling sleeve 3, the respective inclined surfaces 331 and 421 of the stop pieces 33 and the projections 44 may be caused to be in contact with each other, as shown in FIG. 4A. At this time, the lips 312 and an outer annular portion 12 of the hose 1 define a clearance 10 space therebetween and do not contact. By turning the coupling sleeve 3 again, the stop post 32 will move along the curved slot 41 to be farther away from the projections 42. By means of utilizing the relationship between the inclined surfaces 331 of the stop pieces 33 and the inclined surfaces 421 of the projections 42, the resilient pieces 31 are forced to withdraw inwardly. With reference to FIGS. 3 and 4B, if the lips 312 are caused to enter a neck portion 11 of the hose 11 until the stop post 32 has displaced to the curved bulging portion 411' at the lowermost position of the curved slot 41, the lips 312 will be deep within the neck portion of the hose 1, firmly securing the hose 1. When mounting the coupling device of the invention on-site, the hose 1 may be cut into a suitable length before it is inserted into the coupling bushing 4 and secured therein by means of the method described above. An electrical wire 7 may then be passed through the hose 1, the coupling device and the work panel 6 and secured on the machine by means of the nut 5.

Figure 4C:
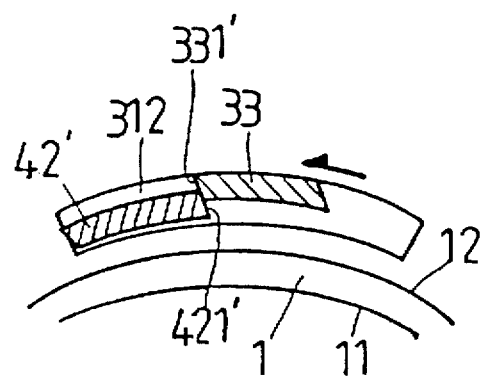

To disengage the coupling device of the invention, it is only necessary to turn the coupling sleeve 3 in a reverse direction so that the stop post 32 moves along the curved slot 41 in the direction of the projections 42. This will cause the inclined surfaces 331 of the stop pieces 33 to disengage from the inclined surfaces 421 of the projections 42 so that an inclined surface 331' contacts the inclined surface 421' of another projection 42. With the continuous turning of the coupling sleeve 3, the inclined surface 331 of the stop piece 33 will slide downwardly along the inclined surface 421 of the projection 42', causing the resilient portions 31 to flare outwardly, as shown in FIG. 4C. At this point, there will be a certain distance between the lips 312 and the annular portion 12 of the hose 1 until the stop post 32 has moved into the curved bulging portion 411" at that end of the curved slot 41 near the projections 42 and be retained. The hose 1 may then be disengaged.

The curved slot 41 is provided not only for positioning the stop post 32 to control the turning of the coupling sleeve 3 and prevent the coupling sleeve 3 from slipping out, it is also arranged to limit the forward displacement of the coupling sleeve 3 to prevent the stop pieces 33 from disengaging from the projections due to the forward displacement of the coupling sleeve 3. This arrangement also enables the lips 312 to force the hose 1 to move axially to urge against the gasket 2 as a result of the contact between the lips 312 and the neck portion 11 of the hose 1, achieving exceptionally tight connection between the hose 1 and the gasket 2. Although the present invention has been illustrated and described with reference to the preferred embodiment thereof, it should be understood that it is in no way limited to the details of such embodiment but is capable of numerous modifications within the scope of the appended claims.

What is claimed is:

1. An oil-tight coupling device for a hose formed with a plurality of annular portions and a plurality of recessed portions each located between adjacent annular portions, comprising:

an oil-tight gasket, a coupling sleeve, and a coupling bushing rotatable engaged with said coupling sleeve, said oil-tight gasket being disposed within said coupling bushing, wherein said coupling sleeve has one end formed with a plurality of inwardly and axially bending resilient portions, each of said resilient portions having a stop piece with a first radially inclined surface formed at each lateral side and disposed at a lower end thereof and said resilient portion having a protruding lip disposed at the lower end thereof for removably engaging one of said recessed portions of said hose, the other end of said coupling sleeve having a stop post, said coupling bushing has a curved slot defined therethrough for receiving said stop post and has a plurality of projections formed at an upper end thereof alternately disposed between each of said resilient portions, each of said projections having a second radially inclined surface formed at each lateral side, said first inclined surfaces of said stop pieces and said second inclined surfaces of said projections are engaged when said coupling sleeve is rotated to an engaging Position relative to said coupling bushing, said stop post being displacable along said curved slot when said coupling sleeve is rotating relative to said coupling bushing, when said first radial inclined surface engages said second radially inclined surface, said stop pieces move inwardly and bias each of said resilient portions inwardly so that each of said lips are received in a recessed portion of said hose for releasably securing said hose in said coupling sleeve said gasket in oil-tight engagement with said coupling bushing and hose, and said curved slot defines a plurality of curved portions for receiving said stop post and for releasably securing said coupling sleeve in a rotational position relative to said coupling bushing.

\* \* \* \* \*